US006430583B1

United States Patent
Taguchi (10) Patent No.: US 6,430,583 B1
(45) Date of Patent: Aug. 6, 2002

(54) SCENARIO EDITING APPARATUS FOR PERFORMING EDITING OF MULTIMEDIA USING FIGURE FEATURE POINTS

(75) Inventor: Daigo Taguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1025 days.

(21) Appl. No.: 08/607,458

(22) Filed: Feb. 27, 1996

(30) Foreign Application Priority Data

Feb. 27, 1995 (JP) .............................. 7-038251

(51) Int. Cl.$^7$ .............................. G06F 17/21
(52) U.S. Cl. .................... 707/501.1
(58) Field of Search ................ 395/762, 773, 395/806, 807, 135, 329, 335, 339; 382/190, 195, 201, 203, 205, 294; 345/113, 114, 435, 329, 335, 339, 302; 707/501, 773, 774, 501.1

(56) References Cited

U.S. PATENT DOCUMENTS

| 5,265,173 A | * 11/1993 | Griffin et al. ................ 382/103 |
| 5,335,298 A | * 8/1994 | Hevenor et al. ............. 382/199 |
| 5,398,684 A | * 3/1995 | Hardy ...................... 128/653.1 |
| 5,499,327 A | * 3/1996 | Satoh ......................... 395/135 |
| 5,559,530 A | * 9/1996 | Yamashita et al. ........... 345/136 |
| 5,577,188 A | * 11/1996 | Zhu ........................... 395/326 |

FOREIGN PATENT DOCUMENTS

JP          3-41573       2/1991

OTHER PUBLICATIONS

Hooper, "Multimedia Scouting ", *IEEE Computer Graphics & Applications*, 1991, pp. 26–38.*

Venkateswar et al., "Extraction of Straight Lines in Aerial Images", *IEEE Transactions on Pattern Analysis and Machine Intelligence*, vol. 14, No. 11, 11/92, pp. 1111–1114.*

Haigron et al., "3D Facial Features Extraction and Prepositioning", *Engineering in Medicine & Biology, 1994 International Conference*, 1994, pp. 688–689.*

* cited by examiner

*Primary Examiner*—Stephen S. Hong
(74) *Attorney, Agent, or Firm*—Foley & Lardner (57) ABSTRACT

A scenario editing apparatus for editing of multimedia including an input manager 104 for managing a user's input and selecting specific multimedia data to indicate the presentation position of the selected multimedia data, an electronic image input unit 109 for inputting an electronic image, a position coordinate analyzer 108 for analyzing the electronic image from the electronic image input unit 109 and extracting figure feature points of the electronic image to obtain position coordinates of the figure feature points, a presentation position memory 101 for storing the position coordinates of the figure feature points of the electronic image as the presentation position coordinates of the multimedia data selected by the input manager 104, and screen output unit 107 for displaying on a display screen the figure feature points of the electronic image and the multimedia data for which the presentation position is edited, thereby performing an interactive editing.

9 Claims, 9 Drawing Sheets

```
HOL.8   00000000
VER.8   00000000
        00010000
        00100000
        01111111
        00100000
        00010000
        00000000
```

| DATA ID | FILE NAME |
|---|---|
| 1 | a:¥d1¥qstn.bmp |
| 2 | a:¥d1¥pict.bmp |
| 3 | a:¥d1¥exp.txt |
| 4 | a:¥d1¥next.bmp |
| 5 | b:¥d2¥line1.bmp |
| 6 | b:¥d2¥line2.bmp |

FIG. 14

| DATA ID | X COODINATE | Y COODINATE |
|---|---|---|
| | | |

~141

| DATA ID | X COODINATE | Y COODINATE |
|---|---|---|
| 2 | | |

~142

| DATA ID | X COODINATE | Y COODINATE |
|---|---|---|
| 2 | 25 | 50 |

| DATA ID | X COODINATE | Y COODINATE |
|---|---|---|
| 2 | 25 | 50 |
| 1 | 316 | 51 |
| 3 | 319 | 107 |
| 6 | 330 | 402 |
| 4 | 545 | 308 |

FIG. 16 (PRIOR ART)

SCENARIO EDITING APPARATUS FOR PERFORMING EDITING OF MULTIMEDIA USING FIGURE FEATURE POINTS

BACKGROUND OF THE INVENTION

1. Field of the Invention

The present invention relates to a scenario editing apparatus, and more particularly to a scenario editing apparatus for editing a scenario of a multimedia application.

2. Description of Related Art

When a scenario of multimedia is edited, it is necessary to specify the presentation (display) position of image data, text data or the like on a display screen. For example, Japanese Laid-open Patent Application No. Hei-3-41573 (titled as "DATA EDITING; METHOD AND APPARATUS THEREOF") discloses such a conventional scenario editing apparatus in which the scenario editing as described above is performed. This conventional scenario editing apparatus will be described with reference to FIG. 16.

Figure 16:
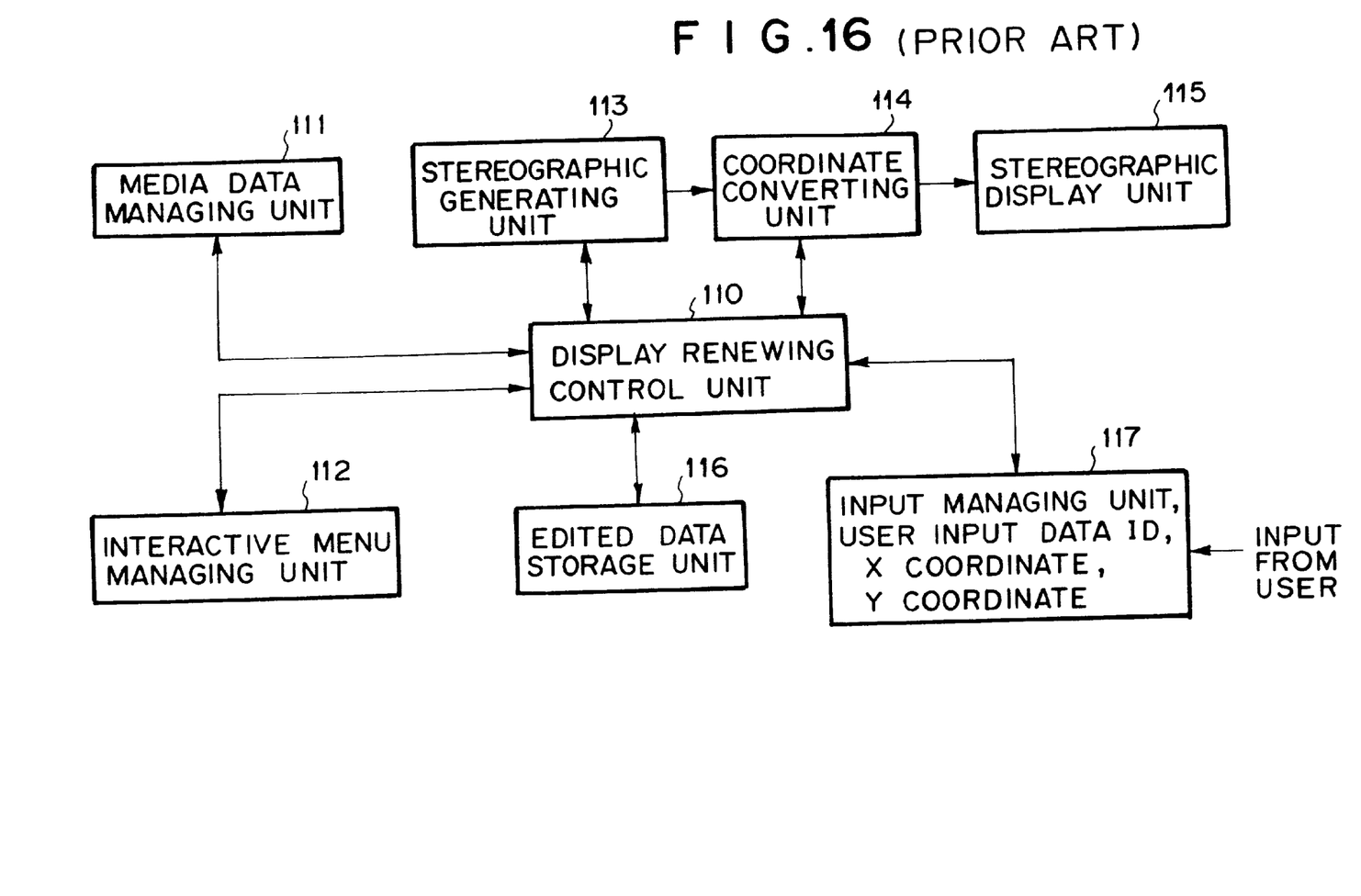
FIG. 16 is a block diagram showing a conventional scenario editing apparatus.

As shown in FIG. 16, the scenario editing apparatus comprises a multimedia managing unit 111 for managing the attributes of media data, an interactive menu managing unit 112 for managing the attributes of each interactive menu, an editing data storage unit 116 for temporarily storing the attributes of the media data and the attributes of the interactive menu for editing, a stereographic generating unit 113 for generating graphic data to be displayed on the basis of an attribute of the multimedia under editing and an attribute of the interactive menu under editing, a coordinate converting unit 114 for converting the graphic data to the coordinates of a drawn image (hereinafter referred to as "image-drawing coordinates") on a display screen, a stereographic display unit 115 for performing a graphic display on the basis of the image-drawing coordinates on the display screen, an input managing unit 117 for receiving an editing command and an input from an user on a stereographic operation, and a display renewing control unit 110 for reading out the attribute data from the media data managing unit 111 and the interactive menu managing unit 112, recording the data in the editing data storage unit 116 and transmitting a command or data to the stereographic generating unit 113, the coordinate converting unit 114 and the stereographic display unit 115 to renew the attribute data in the editing data storage unit 116 according to an input from the input managing unit 117.

In the data editing apparatus thus constructed, the user can freely enlarge/reduce/move graphics displayed on the stereographic display unit 115 by manipulating the input managing unit 117 comprising a mouse, a keyboard, etc. to determine the presentation position of the multimedia data and renew the attribute of the presentation position of the multimedia data, which is stored in the media data managing unit 111, thereby performing the scenario editing.

Figure 2:
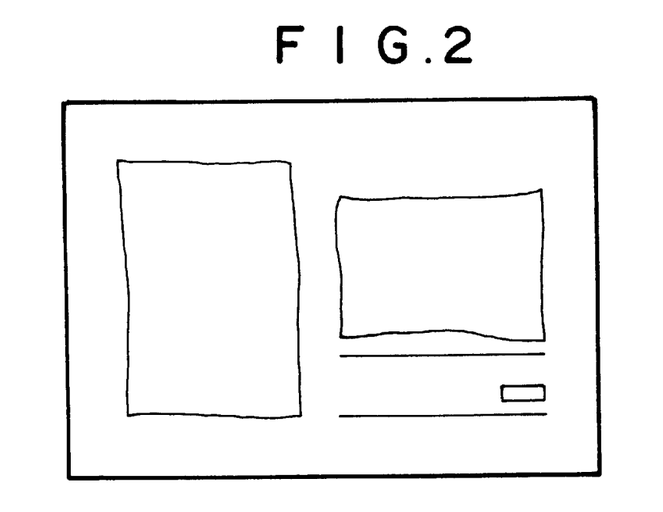
FIG. 2 is a schematic diagram of an example to be input to the scenario editing apparatus of the embodiment.
Figure 3:
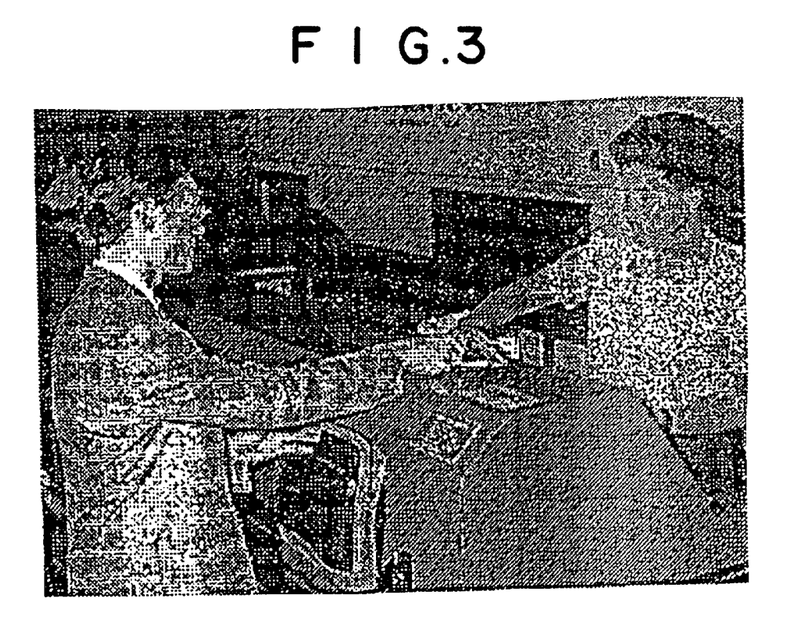
FIG. 3 is a diagram of a photographed picture to be input to the scenario editing apparatus of the embodiment.

In order to facilitate a scenario editing work, it is effective to indicate the presentation position while referring to a schematic diagram drawn on a sheet or the positions of figures drawn on a photographed picture when the presentation position of the multimedia data is indicated. However, the conventional scenario editing apparatus as described above has the following problems. That is, there is no means of inputting electronic data of the schematic diagram or electronic data of the photographed picture, and also there is no means of analyzing the input data to obtain the candidates of position coordinates to be referred to. Furthermore, the scenario editing work is more complicated when the presentation position of multimedia data is indicated while referring to a schematic diagram as shown in FIG. 2 or positions of figures drawn on a photographed picture as shown in FIG. 3.

SUMMARY OF THE INVENTION

An object of the present invention is to provide a scenario editing apparatus in which a position editing of multimedia data can be facilitated by determining the presentation position of multimedia data on the basis of a schematic diagram or position information drawn on a photographed picture when scenario editing is performed for the multimedia.

In order to attain the above object, according to a first aspect of the present invention, a scenario editing apparatus for performing editing of multimedia includes input managing means for managing an user's input and selecting a specific multimedia data to indicate the presentation position of the selected multimedia data, electronic image input means for inputting an electronic image, position coordinate analyzing means for analyzing the electronic image from the electronic image input means and extracting figure feature points of the electronic image to obtain position coordinates of the figure feature points, presentation position storing means for storing the position coordinates of the figure feature points of the electronic image as the presentation position coordinates of the multimedia data selected by the input managing means, and screen output means for displaying on the display screen the figure feature points of the electronic image and the multimedia data for which the presentation position is edited, thereby achieving an interactive editing.

According to a second aspect of the present invention, a scenario editing apparatus includes input managing means for managing input information obtained by an user's operation of an input device to select multimedia data containing image data or text data and select position coordinates when a scenario editing is performed, electronic image input means which is connected to an image electronizing equipment such as a video camera, an electronic still camera or an image scanner, and receives an electronic image which is an origin to determine the presentation position of the multimedia data, position coordinate analyzing means for analyzing the electronic image input to the electronic image input means to determine the position coordinates of figure feature points containing corners or ends of lines of a figure which will be used as candidates of the presentation position of the multimedia data, position coordinate selecting means for determining, from the information of the input managing means, a presentation position which is one of the presentation position candidates of the multimedia data obtained by the position coordinate analyzing means and is selected as the presentation position of the multimedia data by an user, media data storage means for storing multimedia information containing both of data ID for identifying the multimedia data and the name of a file in which the multimedia data are stored, data selecting means for determining, from the information of the input managing means, which multimedia data an user has selected from the multimedia data information stored in the media data storage means as multimedia data for which the user desires a presentation position editing, presentation position storage means for storing the value of the position coordinate selected by the position coordinate selecting means and the data ID of the multimedia data selected by the data selecting means, scenario storage means for storing scenario information containing the data ID of the multimedia data and information on the presentation position, and storing the data ID and the value of the position coordinate to be stored in the presentation position storage means while adding or overwriting the data ID and the value of the position coordinate to scenario information which has been already stored, and screen output means for displaying the candidate of the position coordinate obtained by the position coordinate analyzing means on the display screen in order for the user to select the presentation position of the multimedia data, displaying the information of the multimedia data stored in the media data storage means on the display screen in order for the user to select the multimedia data for which the user performs the presentation position editing, displaying the information stored in the presentation position storage means on the display screen in order for the user to check the multimedia data for which the editing is completed, and the presentation position thereof, and displaying user's input information according to the input information of the input managing means on the display screen, whereby an interactive editing work is achieved.

DETAILED DESCRIPTION OF THE PREFERRED EMBODIMENT

A preferred embodiment according to the present invention will be described hereunder with reference to the accompanying drawings.

Figure 1:
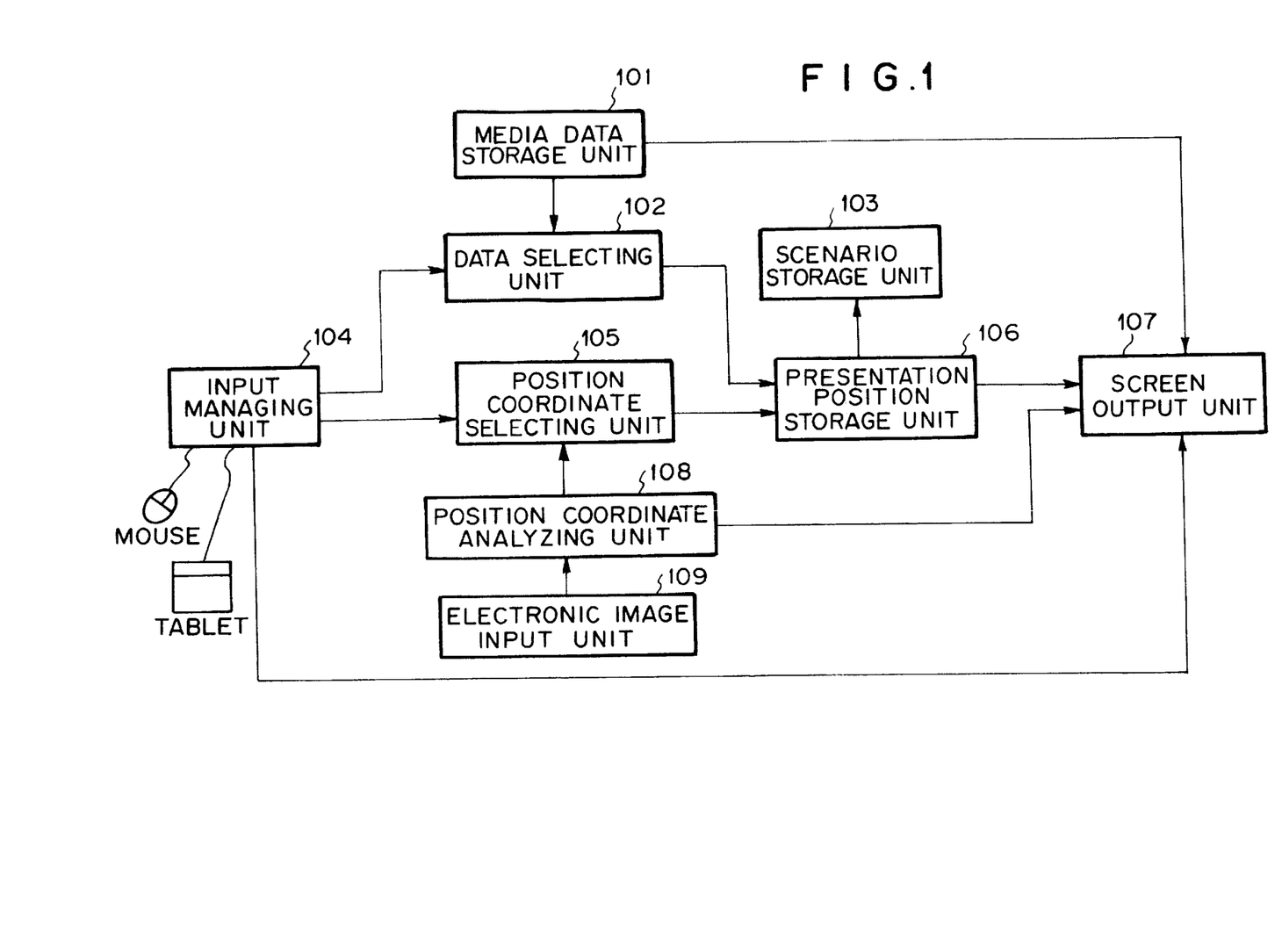
FIG. 1 is a block diagram showing a scenario editing apparatus of an embodiment of the present invention.

FIG. 1 is a block diagram showing a scenario editing apparatus according to an embodiment of the present invention. In FIG. 1, a scenario editing apparatus includes an input managing unit 104 for managing input information obtained by an operation of an input device by an user to select multimedia data containing image data or text data and select the position coordinates thereof when scenario editing is performed, an electronic image input unit 109 which is connected to an apparatus of converting an image to electrical signals (hereinafter referred to as "image electronizing apparatus") such as a video camera, an electronic still camera or an image scanner, and receives an electronic image which is an information source to determine the presentation position of the multimedia data, a position coordinate analyzing unit 108 for analyzing the electronic image input to the electronic image input unit 109 to determine the position coordinates of figure feature points containing corners of figures or ends of lines which will be used as candidates of the presentation position of the multimedia data, a position coordinate selecting unit 105 for determining, from the information of the input managing unit 104, a presentation position which is one of the presentation position candidates of the multimedia data obtained by the position coordinate analyzing unit 108 and is selected as the presentation position of the multimedia data by a user, a media data storage unit 101 for storing multimedia information containing both of data ID (identifier) for identifying the multimedia data and the name of a file in which the multimedia data are stored, a data selecting unit 102 for determining, from the information of the input managing unit 104, which multimedia data a user has selected from the multimedia data information stored in the media data storage unit 101 as multimedia data for which the user desires a presentation position editing, a presentation position storage unit 106 for storing the value of the position coordinate selected by the position coordinate selecting unit 105 and the data ID of the multimedia data selected by the data selecting unit 102, a scenario storage unit 103 for storing scenario information containing the data ID of the multimedia data and information on the presentation position, and storing the data ID and the value of the position coordinate to be stored in the presentation position storage unit 106 while adding or overwriting the data ID and the value of the position coordinate to scenario information which has been already stored, and a screen output unit 107 for displaying the candidate of the position coordinate obtained by the position coordinate analyzing unit 108 on the display screen in order for the user to select the presentation position of the multimedia data, displaying the information of the multimedia data stored in the media data storage unit 101 on the display screen in order for the user to select the multimedia data for which the user performs the presentation position editing, displaying the information stored in the presentation position storage unit 106 on the display screen in order for the user to check the multimedia data for which the editing is completed, and the presentation position thereof, and displaying user's input information according to the input information of the input managing means on the display screen, whereby an interactive editing work is achieved.

The scenario editing apparatus thus constructed will be described in detail with reference to FIGS. 1 to 15.

Now, there is considered such a scenario editing that a schematic diagram as shown in FIG. 2 or a photographed picture as shown in FIG. 3 is input as an input image to the scenario editing apparatus, and then the presentation position of multimedia data is selected or indicated while referring to the positions of figures drawn on the image, thereby preparing scenario information.

The electronic image input unit 109 is connected to the image electronizing apparatus such as an image scanner, an electronic still camera, a video camera or the like, and binary bit map data are input from the image electronizing apparatus through the electronic image input unit 109 into the scenario editing apparatus. The bit map data are defined as follows. An image is divided into plural small squares, and the value of each square is set to "0" when the brightness thereof is higher (lighter) than a predetermined threshold brightness, and to "1" when the brightness thereof is lower (darker) than the threshold brightness. The bit map data comprise an assembly of the values of these squares which are set to "0" or "1" according to the rule as described above. Accordingly, the bit map data have information on the size in the horizontal and vertical directions, and information on the values ("0" or "1") which the respective squares have, as shown in FIG. 4.

Figure 4:
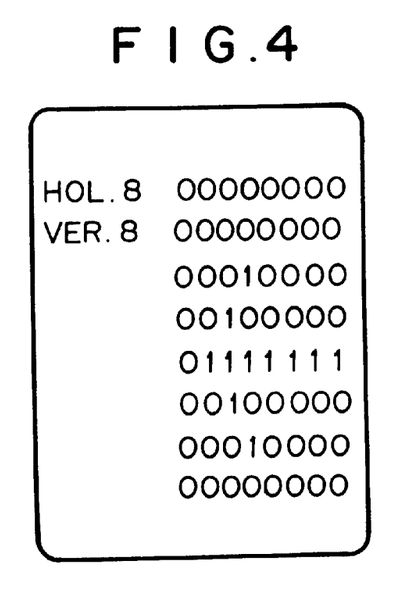
FIG. 4 is a diagram of binary bit map data to be input to a position coordinate analyzing unit of the embodiment shown in FIG. 1.
Figure 5:
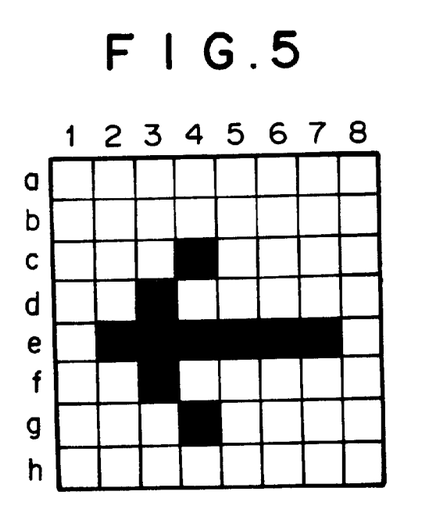
FIG. 5 is a diagram showing an image corresponding to the bit map data shown in FIG. 4.

FIG. 5 shows an image which corresponds to the bit map data shown in FIG. 4. In FIG. 5, numerals (1 to 8), alphabets (a to h) and square lattices are illustrated to clarify the description.

Figure 6:
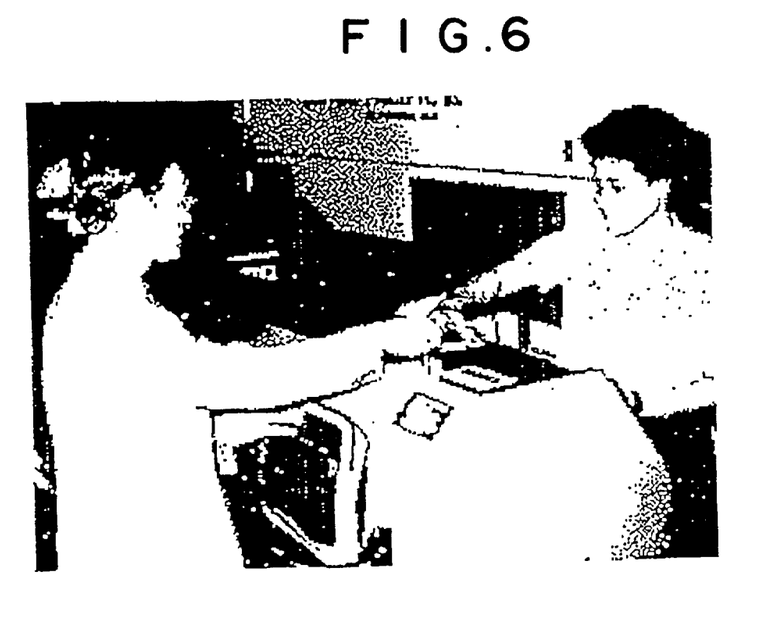
FIG. 6 is a diagram of a binary bit map which is directly prepared from the photographed picture shown in FIG. 3.
Figure 7:
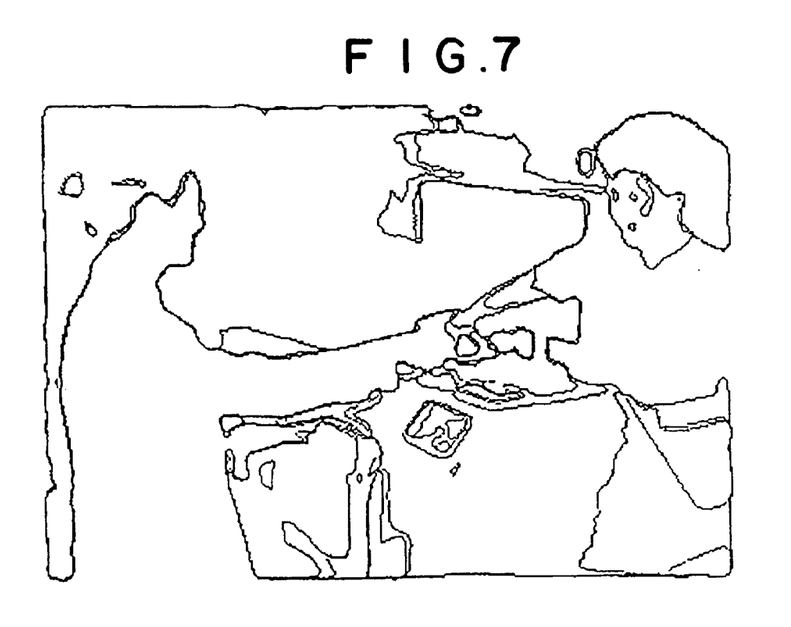
FIG. 7 is a diagram of a binary bit map which is prepared after performing an image filter processing of an outline trace on the photographed picture shown in FIG. 3.

In the case where a photographed picture is used as an input image, if a binary bit map is directly prepared and it is used as an image, the image would be such a display image that each pixel is represented with one of two bits (white or black) as shown in FIG. 6, and thus it is difficult to analyze the display image with the position coordinate analyzing unit 108. In such a case, the image is subjected to an image filtering processing such as an outline tracing operation in which only portions at which the image varies greatly are extracted, whereby a line-drawn image as shown in FIG. 7 can be obtained. Therefore, the analysis of the position coordinates can be easily performed. The function of the image filter such as the outline trace can be achieved by a well known technique which is installed in a photo retouch software on the market such as photoshops of Adobe Systems Incorporated. in U.S.A. or the like.

Figure 8:
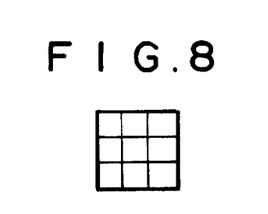
FIG. 8 is a diagram showing an area to be traced when the position coordinate analyzing unit of the embodiment shown in FIG. 1 performs trace analysis.

The binary bit map which is input to the electronic image input unit 109 is analyzed by the position coordinate analyzing unit 108 to obtain figure feature points of drawn figures of the image. Here, the figure feature points are defined as representative points which are required to characterize figures, for example, corners of figures such as four corners of a rectangle, both ends of a line, etc. As an image analysis method, it is used an analysis method of tracing an input image within an area constructed by nine squares as shown in FIG. 8.

Figure 9:
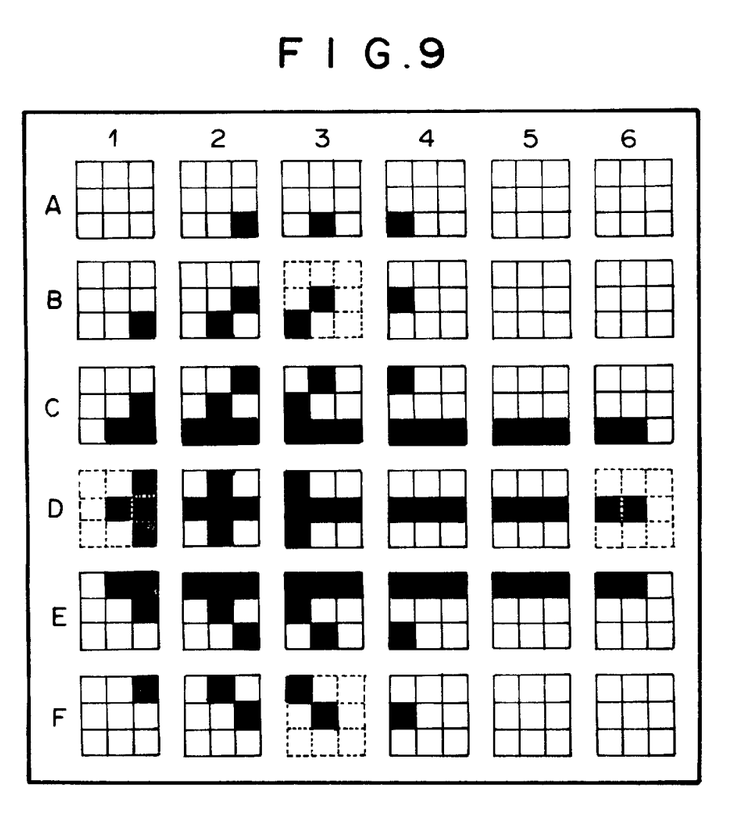
FIG. 9 is a diagram showing a list of patterns which are obtained through the trace analysis of the trace area shown in FIG. 8 by the position coordinate analyzing unit of the embodiment shown in FIG. 1.

According to the trace analysis method as described above, the area as shown in FIG. 8 is subjected to a pattern classification processing while the squares of the area are shifted one by one from the upper left side of the image to be analyzed. FIG. 9 shows an example of the trace analysis of bit map data shown in FIG. 4 (that is, the image shown in FIG. 5).

Specifically, in the case of FIG. 5, an area having nine squares at the upper left corner of FIG. 5 which comprises a square matrix on three columns (1,2,3 in the horizontal direction) x three lines (a,b,c in the vertical direction) is set as a first pattern. Likewise, subsequent patterns are successively obtained in the horizontal direction by successively shifting the squares of the area to the right side one by one. When the shift of the squares to the right side is impossible, the squares of the area are shifted downwardly by one square, and an area having nine squares at the upper left side which comprises a square matrix on three columns (1,2,3 in the horizontal direction) x three lines (b,c,d in the vertical direction) is set as a next pattern. This operation is repeated on the data shown in FIG. 5, and finally 36 patterns as shown in FIG. 9 are obtained.

Figure 10:
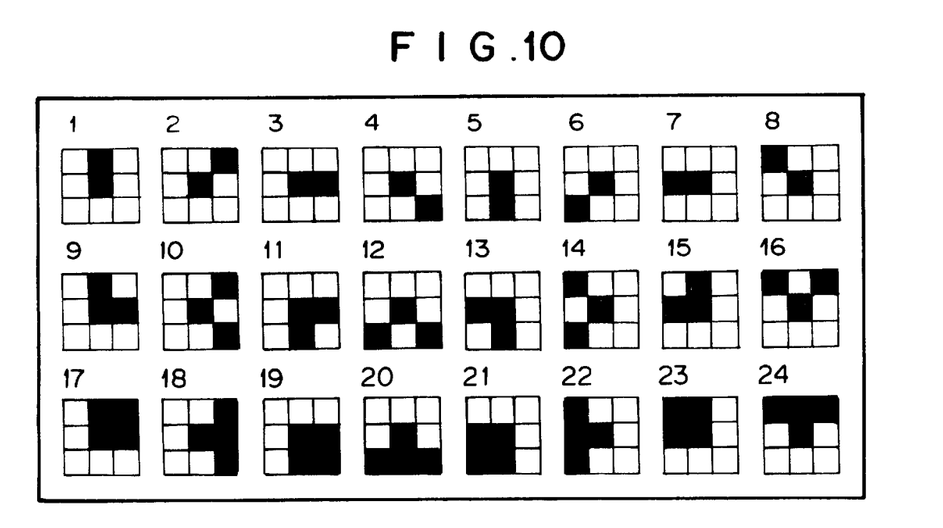
FIG. 10 is a diagram showing a list of patterns in which central square lattices are end points of lines or corners of a figure when the trace analysis is performed in the trace area of FIG. 8.

Subsequently, the patterns shown in FIG. 9 are compared with 24 patterns shown in FIG. 10. The patterns shown in FIG. 10 are classified into three groups. A first group of patterns 1 to 8 is applied to a case where the central square of the square matrix (nine squares) corresponds to an end of a line of the input image, and a second group of patterns 9 to 16 is applied to a case where the central square of the square matrix corresponds to a corner of a figure of the input image. The respective neighboring patterns of the second group are in such a relationship as to be at an angular interval of 45° (i.e., if the pattern of a square matrix is rotated by 45° around the center square thereof, the pattern is coincident with a pattern adjacent to the pattern). Further, a third group of patterns 17 to 24 is applied to a case where the white (blank) square surrounded by black squares of the patterns 9 to 16 of FIG. 10 is filled with black. If a pattern of FIG. 9 is coincident with a pattern of FIG. 10, the point corresponding to the center square of the pattern is set as a figure feature point.

In the 36 patterns shown in FIG. 9, the pattern of line B and column 3, the pattern of line D and column 1, the pattern of line D and column 6 and the pattern of line F and column 3 are coincident with the patterns 6, 18, 7 and 8 in FIG. 10, respectively. As described above, the points of line c and column 4, line e and column 2, line e and column 7, and line g and column 4 in FIG. 5 are analyzed as figure feature points.

In this embodiment, the corners of figures and the ends of lines are determined by using an area which comprises (three squares in the horizontal direction)×(three squares in the vertical direction); however, a larger area may be used to determined the corners and ends, or another pattern may be considered as the corners of figures or ends of lines. Further, the figure feature points may be determined by another method. For example, other geometrical feature points, linear feature points or topological feature points may be used.

Figure 11:
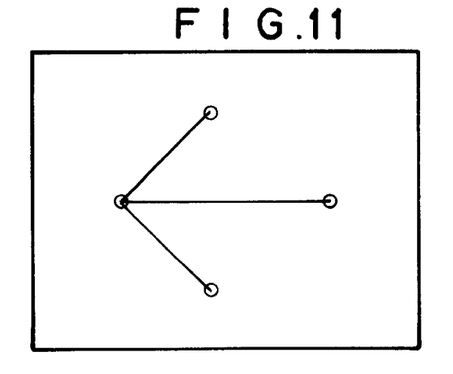
FIG. 11 is a diagram showing a display example on a screen output unit of the embodiment of FIG. 1, which is obtained by determining figure feature points from the image of FIG. 5.
Figure 12:
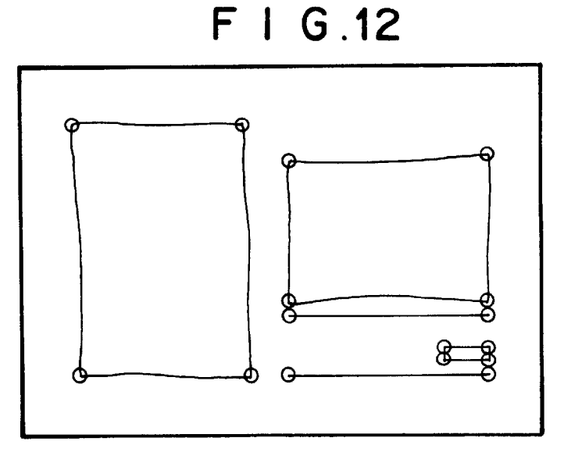
FIG. 12 is a diagram shows another display example on the screen output unit of the embodiment of FIG. 1, which is obtained by determining figure feature points from the image of FIG. 2.

The figure feature points thus obtained are displayed as shown in FIG. 11 by the screen output unit 107 while superposed on the input image. When the same analysis is performed on the schematic diagram of FIG. 2, an output frame shown in FIG. 12 is obtained. In FIGS. 11 and 12, the positions at which circles are superposed on each other correspond to figure feature points. Any other display method may be used to perform the display of the figure feature points insofar as a user can discriminate and select the figure feature points on the screen.

Subsequently, the user determines a figure feature point on the screen output portion 107 which should be coincident with the reference point of the presentation position such as the upper left, the center or the like of the multimedia data, and selects it with a mouse or the like. At this time, on the basis of the information of the input managing unit 104, the position coordinate selecting unit 105 determines the figure feature point which is selected from the figure feature points obtained in the position coordinate analyzing unit 108 by the user, and stores the position coordinate of the selected figure feature point in the presentation position storage unit 106.

Figure 13:
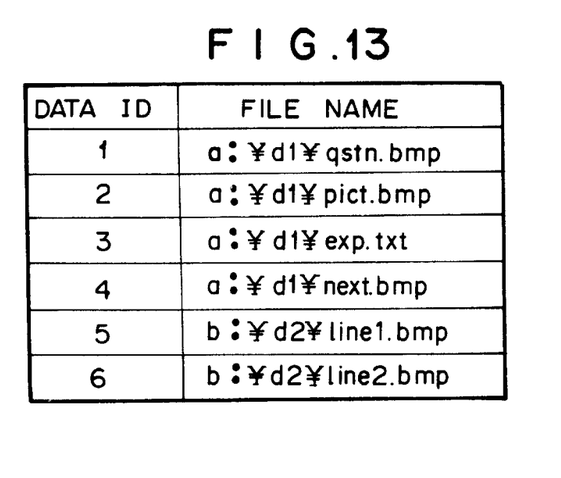
FIG. 13 is a table showing data to be stored in a media data storage unit of the embodiment of FIG. 1.

Further, the media data storage unit 101 displays the media data information stored as shown in FIG. 13 on the screen output unit 107 in a list style or the like so that the user can identify the multimedia data. The user selects from the displayed list or the like multimedia data which he desires to display at the presentation position selected through the presentation position selecting operation as described above. Upon this operation, on the basis of the information from the input managing unit 104, the data selecting unit 102 determines the multimedia data which is selected by the user, and stores the data ID of the selected multimedia data into the presentation position storage unit 106.

Figure 14:
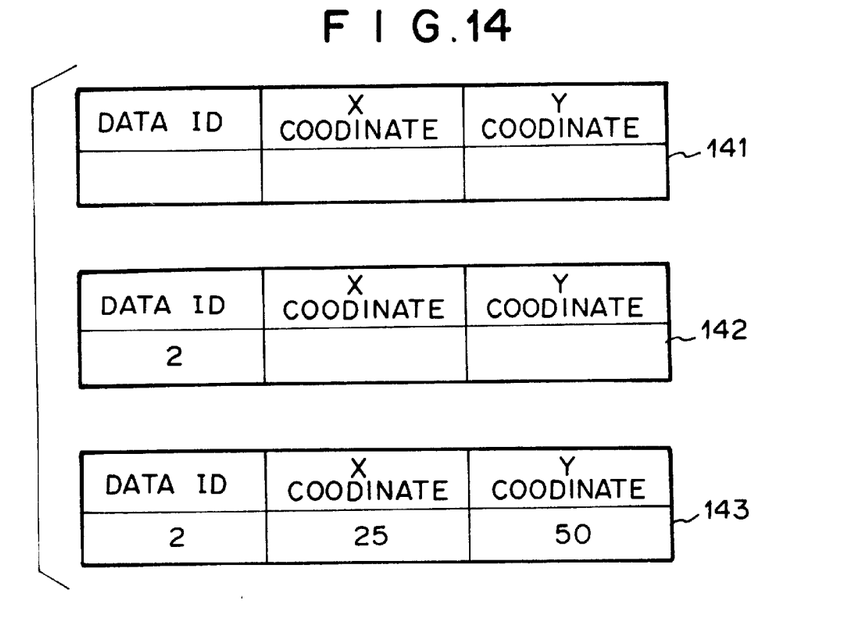
FIG. 14 is a table showing variation of data stored in a presentation position storage unit of the embodiment of FIG. 1.

FIG. 14 is a table showing the variation of the data stored in the presentation position storage unit 106 through a series of operations as described above. In FIG. 14, data 141 show a data status where the figure feature points to specify presentation position and the multimedia data for which the presentation position is edited have not yet been determined by the position coordinate selecting unit 105 and the data selecting unit 102. Data 142 show a data status after the figure feature point to specify the presentation position is determined by the position coordinate selecting unit 105, and data 143 show a data status after the multimedia data for which the presentation position is edited is further determined by the data selecting unit 102.

In this embodiment, the figure feature point is first determined by the position coordinate selecting unit 105, and then the multimedia data for which the presentation position is edited is determined by the data selecting unit 102. However, the order of these operations may be inverted. That is, the multimedia data which is edited by the data selecting unit 102 may be first selected.

Figure 15:
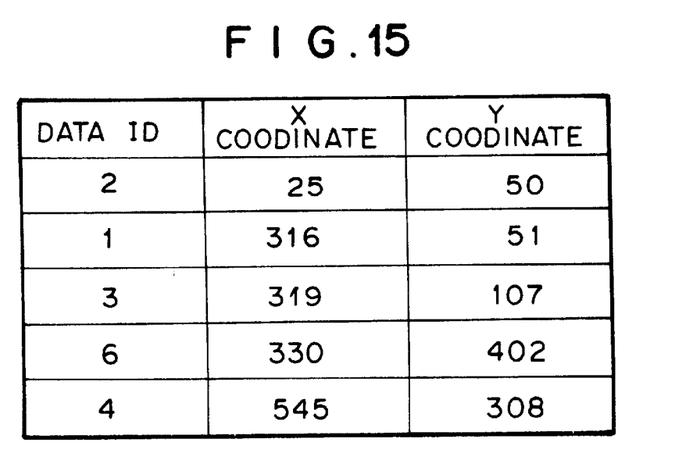
FIG. 15 is a table showing data to be stored in a scenario storage unit of the embodiment of FIG. 1.

Finally, the presentation position storage unit 106 stores the presentation position information of the data status 143 in the scenario storage unit 103, and scenario information as shown in FIG. 15 is prepared. The table of FIG. 15 shows the description of a scenario in which the multimedia data of data ID 2 are displayed while the display reference position of the multimedia data such as the upper left side, the center or the like of the multimedia data is coincident with a position of 25 (X-coordinate) and 50 (Y-coordinate).

As described above, according to the present invention, when the scenario editing of the multimedia data is performed, the presentation position of the multimedia data is determined on the basis of the position information which is drawn on a schematic diagram or a photographed picture, whereby the position editing of the multimedia data can be facilitated.

While this invention has been particularly shown and described with reference to the preferred embodiment thereby, it will be understood that various changes in form and details may be made therein without departing from the spirit and scope of the invention.

What is claimed is:

1. A scenario editing apparatus for performing editing of multimedia, comprising:
   an input managing unit for managing an input from a user, the input indicating a specific multimedia data and a presentation position of the specific multimedia data;
   a data selecting unit coupled to the input managing unit and to a media data storage unit for determining ID information of the specific multimedia data from the media data storage unit;
   an electronic image input unit for inputting an electronic image;
   a position coordinate analyzing unit coupled to the electronic image input unit and analyzing the electronic image from said electronic image input unit to extract figure feature points of the electronic image to obtain position coordinates of the figure feature points to be used as candidates of a presentation position of the multimedia data, said presentation position corresponding to a reference position on a display screen;
   a position coordinate selecting unit coupled to said input managing unit and said position coordinate analyzing unit for selecting the position coordinates of one of said candidates as the coordinates of said presentation position of the specific multimedia data;
   a presentation position storing unit coupled to said position coordinate selecting unit and said data selecting unit for storing the position coordinates of said selected candidate and for storing associated therewith said ID information of said specific multimedia data;
   a scenario storage unit coupled to said presentation position storing unit for storing scenario information containing the ID information of the multimedia data and information on the presentation position, and for storing the ID information and the position coordinates of said selected candidate corresponding to said presentation position; and
   a screen output unit for displaying on the display screen the figure feature points of the electronic image and the specific multimedia data at the selected presentation position, thereby achieving an interactive editing.

2. The scenario editing apparatus as claimed in claim 1, wherein said position coordinate analyzing means determines the position coordinates of figure feature points containing corners of figures as candidates of the presentation position of the multimedia data.

3. The scenario editing apparatus as claimed in claim 1, wherein said position coordinate analyzing means determines the position coordinates of figure feature points containing ends of lines as candidates of the presentation position of the multimedia data.

4. The scenario editing apparatus as claimed in claim 1, wherein said ID information includes a data ID to discriminate the specific multimedia data.

5. A scenario editing apparatus for performing editing of multimedia data, comprising:
   input managing means for managing input information obtained by an operation by a user of an input device to select multimedia data containing image data or text data and select position coordinates when scenario editing is performed;
   electronic image input means which is connected to an electronic image equipment and receives an electronic image which is used to determine a presentation position of the multimedia data, said presentation position corresponding to a reference position on a display screen;
   position coordinate analyzing means for analyzing the electronic image input of said electronic image input means to determine position coordinates of figure feature points containing corners of figures or ends of lines of the figures which will be used as candidates of the presentation position of the multimedia data;
   position coordinate selecting means for determining, from the information of said input managing means, one of the presentation position candidates of the multimedia data obtained by said position coordinate analyzing means as corresponding to the presentation position of the multimedia data;

media data storage means for storing multimedia information containing both a data ID for identifying the multimedia data and a name of a file in which the multimedia data are stored;

data selecting means for determining, from the information of said input managing means, which multimedia data the user has selected from the multimedia data information stored in said media data storage means as multimedia data for which the user desires presentation position editing;

presentation position storage means for storing a value of the position coordinate selected by said position coordinate selecting means and the data ID of the multimedia data selected by said data selecting means;

scenario storage means for storing scenario information containing the data ID of the multimedia data and information on the presentation position, and for adding or overwriting the data ID and the value of the position coordinate of the selected multimedia data to the scenario information which has been already stored; and screen output means for displaying the candidates of the presentation position coordinates obtained by said position coordinate analyzing means on said display screen in order for the user to select said one candidate as the presentation position of the multimedia data, for displaying the information of the multimedia data stored in said media data storage means on the display screen in order for the user to select the multimedia data for which the user performs the presentation position editing, for displaying the information stored in said presentation position storage means on the display screen in order for the user to check the ID and the presentation position of the multimedia data for which the editing is completed, and for displaying inputs by the user according to the input information of the input managing means on the display screen, whereby an interactive editing work is achieved.

6. A scenario editing apparatus for performing editing of multimedia, comprising:

input managing means for managing an input from a user, the input indicating a specific multimedia data, and a presentation position and ID information of the specific multimedia data;

electronic image input means for inputting an electronic image;

position coordinate analyzing means for analyzing the electronic image from said electronic image input means and extracting figure feature points of the electronic image to obtain position coordinates of the figure feature points;

selecting means for selecting one of the position coordinates of the figure feature point as a selected presentation position coordinate;

presentation position storing means for storing the selected presentation position coordinate;

scenario storage means for storing scenario information containing the ID information of the multimedia data and information on the presentation position, the selected presentation position and for adding or overwriting the ID information of the specific multimedia data and the selected presentation position coordinate to the scenario information which has already been stored; and screen output means for displaying on a display screen the figure feature points of the electronic image and the specific multimedia data at the selected presentation position coordinate, thereby achieving an interactive editing, wherein the position coordinate analyzing means determines the position coordinates of figure feature points containing corners of figures as candidates of the presentation position of the multimedia data by subdividing the electronic image into separate contiguous regions, and by comparing data in each of the separate contiguous regions to prestored data.

7. A scenario editing apparatus for performing editing of multimedia, comprising:

input managing means for managing an input from a user, the input indicating a specific multimedia data, and a presentation position and ID information of the specific multimedia data;

electronic image input means for inputting an electronic image;

position coordinate analyzing means for analyzing the electronic image from said electronic image input means and extracting figure feature points of the electronic image to obtain position coordinates of the figure feature points;

selecting means for selecting one of the position coordinates of the figure feature points as a selected presentation position coordinate;

presentation position storing means for storing the selected presentation position coordinate;

scenario storage means for storing scenario information containing the ID information of the multimedia data and information on the presentation position, the selected presentation position and for adding or overwriting the ID information of the specific multimedia data and the selected presentation position coordinate to the scenario information which has already been stored; and screen output means for displaying on a display screen the figure feature points of the electronic image and the specific multimedia data at the selected presentation position coordinate, thereby achieving an interactive editing, wherein the position coordinate analyzing means determines the position coordinates of figure feature points containing ends of lines as candidates of the presentation position of the multimedia data by subdividing the electronic image into separate contiguous regions, and by comparing data in each of the separate contiguous regions to prestored data.

8. The scenario editing apparatus as claimed in claim 6, wherein the selecting means selects one of the position coordinates of the figure feature points as the selected presentation position coordinate in accordance with the input from the user, and wherein the selected presentation position coordinate is utilized to place the specific multimedia data onto a particular location on the electronic image.

9. The scenario editing apparatus as claimed in claim 7 wherein the selecting means selects one of the position coordinates of the figure feature points as the selected presentation position coordinate in accordance with the input from the user, and wherein the selected presentation position coordinate is utilized to place the specific multimedia data onto a particular location on the electronic image.

* * * * *